(12) United States Patent
Cutler

(10) Patent No.: US 11,566,484 B2
(45) Date of Patent: Jan. 31, 2023

(54) ELECTRICALLY OPERATED CHEMICAL STICK LAUNCHER

(71) Applicant: James E. Cutler, Cotulla, TX (US)

(72) Inventor: James E. Cutler, Cotulla, TX (US)

(*) Notice: Subject to any disclaimer, the term of this patent is extended or adjusted under 35 U.S.C. 154(b) by 0 days.

(21) Appl. No.: 17/352,263

(22) Filed: Jun. 19, 2021

(65) Prior Publication Data

US 2021/0396091 A1  Dec. 23, 2021

Related U.S. Application Data

(60) Provisional application No. 63/041,818, filed on Jun. 20, 2020.

(51) Int. Cl.
| | | |
|---|---|---|
| *E21B 33/068* | (2006.01) | |
| *E21B 34/02* | (2006.01) | |
| *F16K 31/06* | (2006.01) | |
| *F16K 37/00* | (2006.01) | |
| *E21B 43/12* | (2006.01) | |

(52) U.S. Cl.
CPC .......... *E21B 33/068* (2013.01); *E21B 34/02* (2013.01); *F16K 31/0648* (2013.01); *F16K 37/00* (2013.01); *E21B 43/13* (2020.05)

(58) Field of Classification Search
CPC ........ E21B 23/08; E21B 33/068; E21B 34/02; E21B 41/02; E21B 43/13; F16K 31/0648; F16K 37/00
See application file for complete search history.

(56) References Cited

U.S. PATENT DOCUMENTS

| | | | |
|---|---|---|---|
| 6,039,122 A | 3/2000 | Gonzalez | |
| 6,044,905 A * | 4/2000 | Harrison, III | E21B 41/02 166/70 |
| 6,056,058 A | 5/2000 | Gonzalez | |
| 6,269,875 B1 * | 8/2001 | Harrison, III | E21B 33/068 166/66 |
| 6,283,202 B1 * | 9/2001 | Gaines | E21B 33/068 166/310 |
| 6,478,089 B2 | 11/2002 | Alves | |
| 6,637,512 B2 | 10/2003 | Casey | |
| 7,040,401 B1 | 5/2006 | McCannon | |
| 7,234,525 B2 | 6/2007 | Alves | |
| 2006/0054326 A1 * | 3/2006 | Alves | E21B 33/068 166/310 |
| 2015/0114626 A1 * | 4/2015 | Hatten | E21B 33/068 166/381 |
| 2021/0396091 A1 * | 12/2021 | Cutler | F16K 31/0648 |

* cited by examiner

*Primary Examiner* — Daniel P Stephenson
(74) *Attorney, Agent, or Firm* — G. Turner Moller, Jr.

(57) ABSTRACT

A chemical stick launcher includes a stack of vertically mounted low voltage electrically operated valves providing spaces between the valves for chemical sticks. The valves are manipulated by a controller to drop sticks from the compartments between the valves after suitable time delays so the launcher can supply chemicals to a hydrocarbon well over a period of time. The stack is insulated to reduce the operating temperature of the launcher and thereby allow a wider variety of chemical compositions to be used. The low voltage electrically operated valves include a front panel providing a visual indicator of whether the valves are open or closed. The valves are mounted on the stack so the front panels face in the same direction so a standing person can see all the indicators from a single position.

20 Claims, 3 Drawing Sheets

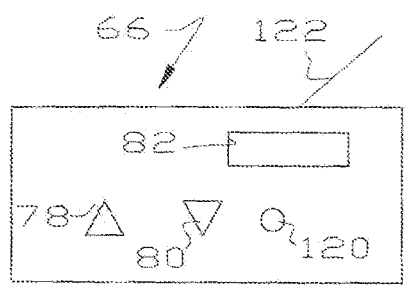
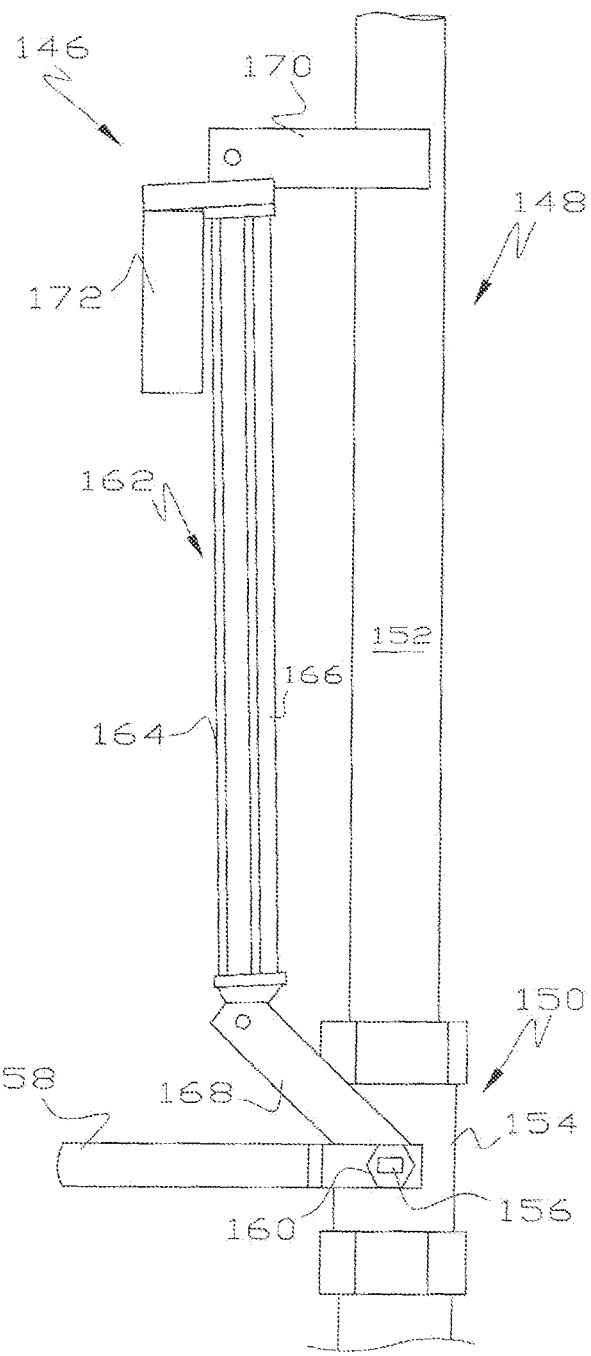
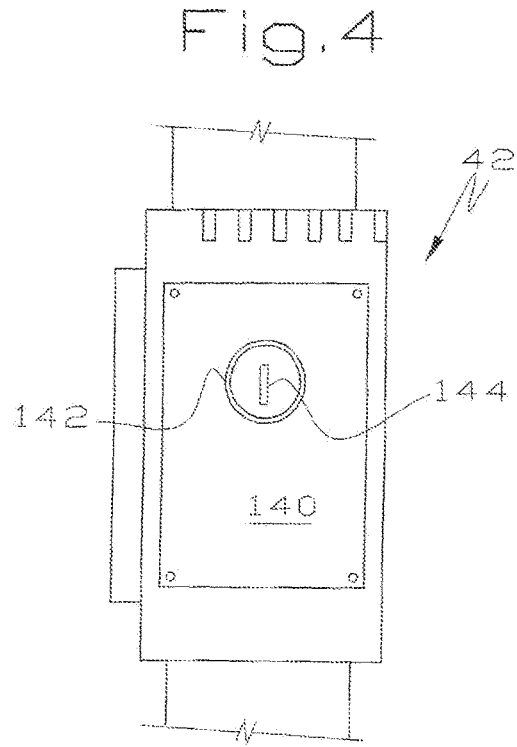

ically operated valves spaced in a vertical tubular array.
ELECTRICALLY OPERATED CHEMICAL STICK LAUNCHER This application is based in part on Provisional Application Ser. No. 63/041,818, filed Jun. 20, 2020, the disclosure of which is incorporated herein by reference.

This invention relates to an improved system for delivering chemical sticks into a hydrocarbon well.

BACKGROUND OF THE INVENTION

This invention relates to an improved system for delivering chemical sticks into an oil or gas well. The sticks are usually soap sticks but other chemicals, such as corrosion inhibitors, may be delivered into hydrocarbon wells or other vertically lower compartments where the sticks fall by gravity.

Gas wells have a typical and recognized life cycle. At the outset, a gas well is almost always capable of flowing a sufficient gas volume to keep any liquid in the production string moving upwardly to the surface. As the well ages, the produced gas volume becomes insufficient to keep liquids moving upwardly so liquids accumulate in the production string and at the bottom of the well. Very soon, accumulated liquids at the bottom of the well are sufficient to slow production. Ultimately, sufficient liquids accumulate in the bottom of the well to kill the well, which is industry terminology describing when the well quits producing.

There are a variety of approaches that oil operators use to maintain production in a gas well as it ages. One of the first approaches is to drop a stick into the production string that contains a soap, surfactant or foaming agent. These sticks are universally called soap sticks. At the outset, a gauger may drop a single stick into the well, open and close a valve on the Christmas tree to start and stop flow and thereby agitate liquid in the well to entrain liquid in the well into a foam. The well may then be opened into a tank to discharge a quantity of foam and thereby remove a quantity of water from the well. The gauger then puts the well back on production by opening a valve directing produced gas toward a surface installation and ultimately a sales meter.

This process continues until a soap stick dropped once in a while is ineffective to keep the well producing so soap sticks are dropped daily or as often as the gauger arrives at the well. Sooner-or-later, it becomes desirable to deliver soap sticks at various spaced times in a single twenty four hour period. It accordingly becomes desirable to automate this process by attaching a soap stick launcher to the Christmas tree so soap sticks can be dropped periodically and reloaded by the gauger during a daily visit. Soap stick launchers have been proposed for many years of which U.S. Pat. Nos. 7,040,401 and 7,234,525 are exemplary.

BRIEF DESCRIPTION OF THE INVENTION

In the disclosed device, a vertical tubular array is installed on top of the well's Christmas tree, which is an assembly of valves controlling flow from the well. A series of electrically operated valves are spaced in the vertical array so one or more soap sticks are supported by each valve. The array may be loaded with soap sticks by closing the lowermost valve, dropping one or more sticks into the vertical array, closing the next higher valve, dropping one or more sticks onto the next higher valve and so on. A controller manipulates the valves, one at a time, in the array to drop sticks at predetermined intervals until the vertical array is empty. When the gauger next visits the well, the array is reloaded.

To date, soap stick launchers have been operated by pressurized cylinders using well head gas or compressed air as a source of power. This either requires an auxiliary air compressor or releases a substantial quantity of natural gas into the atmosphere when the rods in the cylinders move. Methane, the most common component of natural gas, is a much more potent greenhouse gas than carbon dioxide. Even though the volume of natural gas released in each cycle is small, conventional soap stick launchers typically operate several times daily. Given the large number of wells serviced by soap stick launchers, the cumulative annual amount of natural gas released by natural gas powered soap stick launchers is large and therefore an attractive target for zealous bureaucrats.

It is accordingly an object of this invention to provide an improved chemical stick launcher incorporating electrically operated valves spaced in a vertical tubular array.

Another object of this invention is to provide an improved chemical stick launcher which reduces or eliminates greenhouse gas releases from the launcher as a function of release of a power gas.

These and other objects and advantages of this invention will become more fully apparent as this description proceeds, reference being made to the accompanying drawings.

BRIEF DESCRIPTION OF THE DRAWINGS

FIG. 3 is a front view of a timer used in the embodiment of FIG. 1;

FIG. 4 is a front view of a controller box; and

FIG. 5 is a view of a different type electrically actuated valve.

DETAILED DESCRIPTION OF THE INVENTION

Figure 1:
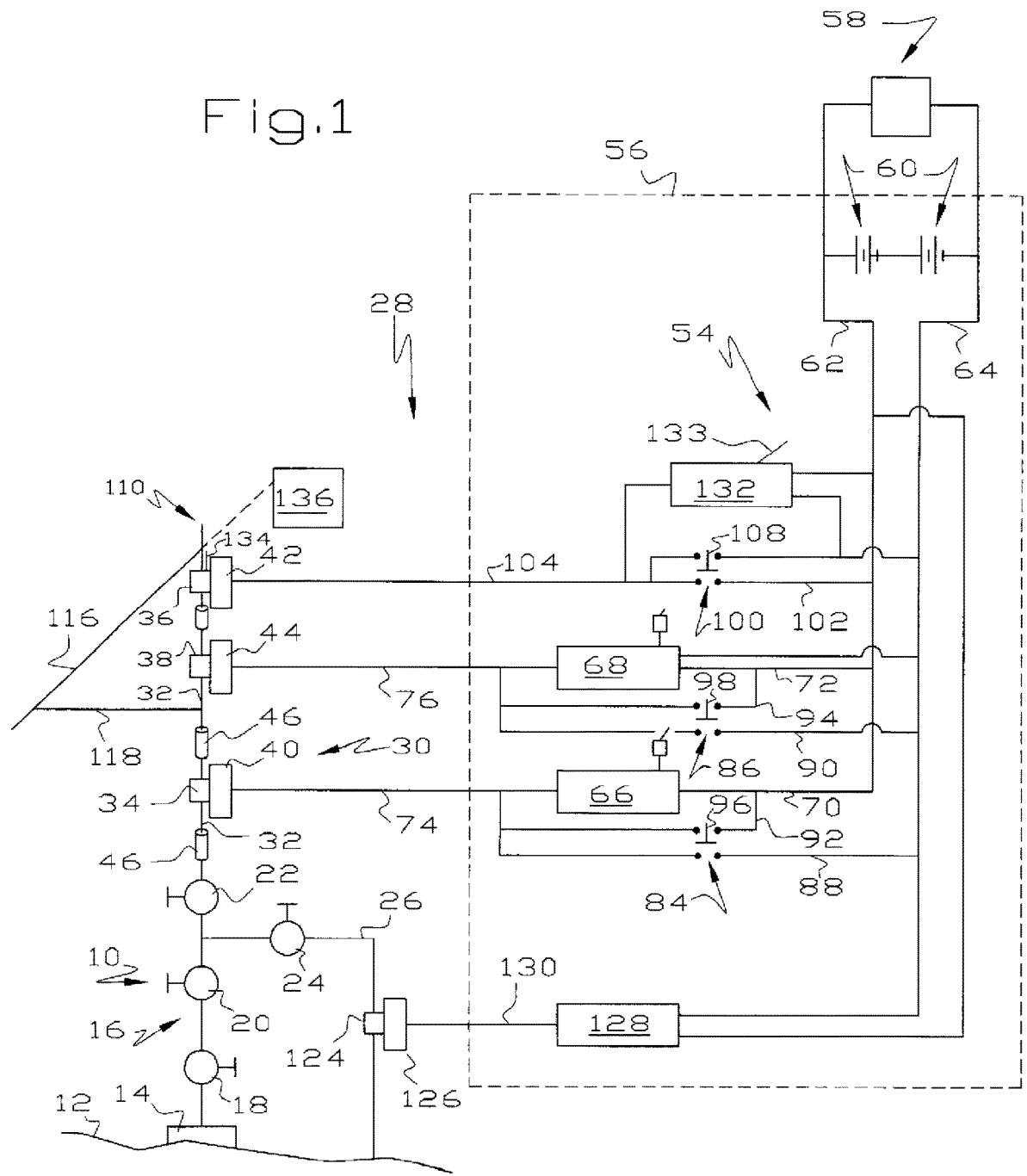
FIG. 1 is a schematic view of a gas well equipped with a stick launcher.

Referring to FIG. 1, a gas well 10 includes a pipe string (not shown) extending to ground level 12 and having a well head 14 and a Christmas tree 16. A pair of inline master valves 18, 20, a top valve 22 and a wing valve 24 control flow from the well 10 in a conventional manner. A flow line 26 communicates with a surface installation (not shown) which may include a compressor, dehydrator, sales meter and the like. The illustrated well arrangement is merely exemplary and many different casing, tubing and Christmas tree arrangements are known and widely used. A very common arrangement is for the well 10 to be a tubingless completion where the pipe string (not shown) is a tubing string cemented in the well bore.

On top of the tree 16 is a chemical stick launcher 28 in the form of an upright tubular array 30 including a series of conduit sections or nipples 32, a bottom valve 34, a top valve 36 and one or more intermediate valves 38. The conduit sections 32 may conveniently be sections of tubing threaded to be received in the valves 34, 36, 38. The conduit sections 32 may be of a length suitable to receive one or a multiple of chemical sticks. Soap sticks are currently made in 18" lengths so the conduit sections 32 may conveniently be slightly longer or slightly longer than a multiple of 18" so each nipple can receive one or a multiple of soap sticks. Although the upper valve 36 may be manually operated because its mode of operation is different than the valves 34, 38, it may be preferred to have all valves electrically operated by a low voltage direct current actuator or motor 40, 42, 44.

The valves 34, 36, 38 may be any suitable electrically operated valve having the capability of opening sufficiently to pass a chemical stick and be powered by current developed by a solar panel installation as more fully described hereinafter. One suitable manufacturer is Assured Automation of Rosella, N.J. The valves 34, 36, 38 may be directly driven by an electric motor or indirectly through a gear reducer. The valves 34, 36, 38 may preferably be of a low voltage type, meaning they are configured to operate at voltages in the range of 6-24 volts because they are much easier to make explosion proof and can be readily powered from a low voltage solar panel assembly.

Figure 2:
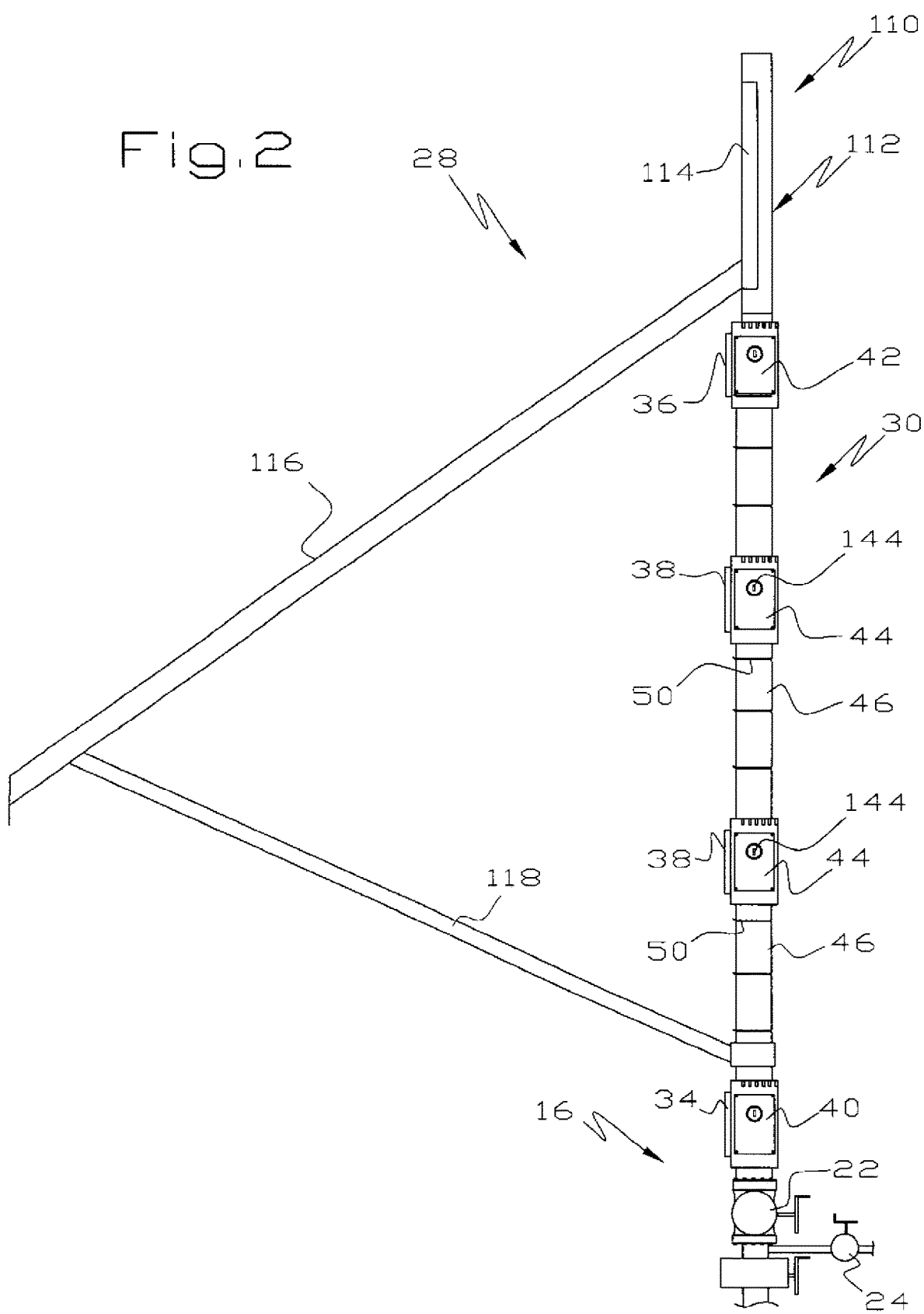
FIG. 2 is a front view of a larger stick launcher, certain parts being broken away for clarity of illustration.

As shown in FIG. 2, an advantageous element of the launcher 28 may be an insulating sheath 46 wrapped around the conduit sections 32 to reduce heat gain and thus the maximum temperature inside the launcher 28. There are some stick compositions, either soap, corrosion inhibitor or otherwise, which are operative in uninsulated chemical launchers. The insulating sheath 46 allows the use of a much wider range of formulations which, in many circumstances, provide advantages well worth the expense of the insulating sheath 46 because some soap and other compounds are in danger of melting in uninsulated launchers at expected summer temperatures above 105°-115° F. Typically, the sheath 46 includes segments 48 of insulating material which are captivated to the conduit sections 32 by bands 50 such as ties or adjustable clamps. One example of the insulating material is NUMGARD, available from PolyGuard Products of Ennis, Tex. having an R value of 2.98, although many other possibilities are operative. The insulating sheath 46 provides an R value of at least two. While counterintuitive, the valve bodies 52 of the valves 34, 36, 38 are typically not wrapped. This does not substantially affect the internal temperature of the vertical array 30 because steel, the material of the conduit sections 32, is oddly about as effective in transmitting heat as a ceramic such as aluminum oxide. The components of the stack 30 that are not wrapped with the insulating sheath 46 may be painted with a highly reflective paint. The advantage of the sheath 46 is that much of its insulating qualities remain when it gets dirty, which is inevitable.

As shown in FIG. 1, a controller 54 is provided to operate, or enable operation of, the valves 34, 36, 38 in a suitable manner and is typically enclosed in a waterproof container 56 having an openable door (not shown) providing access to the components of the controller 54. The controller 54 is powered by a solar panel array 58 and one or more batteries 60. To this end, a pair of electrical leads 62, 64 provide positive and negative polarity direct current to the controller 54.

The controller 54 includes a timer or timer circuit 66, 68 for the lower valve 34 and each of the intermediate valves 38. The timers 66, 68 may be of any suitable type and may preferably be commercially available deer feeder timers such as from Amazon and known as a Highwild 6V/12V Universal Game Feeder Digital Timer. These are manufactured in large numbers for outdoor use, are relatively inexpensive and quite reliable. One peculiarity of deer feeder timers is they are more efficient in powering a motor in one direction, i.e. the rotational direction of a spinner blade of the feed distributor, than in the opposite direction. When using such timers in the launcher 28, the more efficient operating direction of the timer may be used for valve opening movement because this is normally the only direction of timer induced movement.

A characteristic of any direct current driven motor, such as the motors 40, 42, 44, is that direct current of one polarity drives the motor in one direction and the opposite polarity drives the motor in the opposite direction. Each timer 66, 68 accordingly has one lead 70, 72 connected to one of the leads 62 and a second link 74, 76 connected to the motors 40, 44 for driving the motors 40, 44 in the valve opening direction. Each timer 66, 68 is equipped with actuators 78, 80 to set the time for the internal switch (not shown) of the timer to close and thereby open the respective valve 34, 36. Conveniently, the time for timer operation is displayed through a window 82 in the timer as shown in FIG. 3. The timers 66, 68 accordingly connect separately to each the actuators 40, 44 and are capable of delivering sufficient energy to operate the actuators 40, 44 and thereby open the valves 34, 38 in their normal mode of operation as will become more fully apparent hereinafter. The links 74, 76 may be hard wired and carry power or may merely be communication links, wired or wireless, controlling switches (not shown) for connecting the actuators 40, 44 to a power source.

The controller 54 operates the launcher 28 in a cyclic manner including sequentially emptying chambers provided by the conduit sections 32 and partially preparing the launcher 28 for reloading. Assuming the cycle starts with the launcher 28 filled, i.e. one or more soap sticks in each of the sections 32, the controller 54 opens the lowermost valve 34 at a predetermined time to drop chemical sticks inside the conduit section immediately above the valve 34. The soap stick or sticks in the section 32 fall by gravity through the Christmas tree 16 into the well 10 and produce a foam-water mixture in the bottom of the well. This lowers the density of the accumulated water which is raised to the surface by produced gas when the well 10 is turned back on to flow through the flow line 26. Preferably, the valve 34 remains open until the controller 54 opens the valve 38 thereby dropping sticks supported on the valve 38. At this point in the cycle, the launcher 28 is empty. When the gauger next arrives at the well 10, one task is to reload the launcher 22. The first step is to close the lower valve 34 to isolate the well 10 from the launcher 28 as pointed out hereinafter. The next step is to open the upper valve 36 to provide access to the vertical stack 30. In some embodiments, this may be done manually from ground level if the uppermost valve is manually operated, as by pulling on a handle (not shown) connected to the uppermost valve.

In preparation to loading the launcher 28, it is necessary to close the valve 34 and isolate the well 10 from the launcher 28 so the upper valve 36 can be opened to receive chemical sticks. Later it is necessary to close the valves 34, 38 during stick loading. To these ends, double pole, double throw switches 84, 86 are provided to bypass the timers 66, 68. The switches 84, 86 include a first lead 88, 90 connected to the lead 64 which is of opposite polarity to the lead 62 and which delivers current of valve closing polarity to the valves 34, 38. The switches 84, 86 also include a second lead 92, 94 to bypass the timers 66, 68 and deliver current of valve opening polarity to the valves 34, 38. The double pole double throw switches 84, 86 include manual switch operators 96, 98.

In some embodiments, it may be preferred that the upper valve 36 is opened and closed by manipulation of a double pole, double throw switch 100 connecting an inlet lead 102 of the polarity to open the valves to an outlet lead 104. A second inlet lead 106 connects to the switch 100 to deliver direct current of a polarity to close the valve 36. A switch operator 108 allows manual operation of the switch 100. When the gauger arrives at the well 10, the upper valve 36 is closed at the end of the stick launching cycle while the lower and middle valves 34, 38 are open. After manipulating the switch 84 and closing the lower valve 34, the switch 100 is manipulated to open the upper valve 36. This allows chemical sticks to be dropped into a hopper 110 on top of the stack 30. In one sense, FIG. 1 is misleading because it shows the switch operators 96, 98, 108 inside the container 56 whereas, in fact, the switch operators 96, 98, 108 may be accessible from outside the container 56.

As shown in FIG. 2, the hopper 110 includes an open top conduit section 112 having an open vertical slot 114. A loading ramp 116 inclines away from the open slot 114 and is supported by a brace 118 attached to the Christmas tree 16. The hopper 110 and loading ramp 116 are illustrated to be of conventional design with the ramp 116 being U- or V-shaped to receive chemical sticks thereon. One or more chemical sticks (not shown) are placed in the ramp 116 and a push stick (not shown) is used to push the chemical sticks up the ramp 116. When the first chemical stick reaches the open slot 114, it is deflected upwardly until it falls by gravity into the stack 30. If multiple sticks are loaded into the launcher 28, the first stick is allowed to fall into the well 10 and the pusher advances the second stick until it is deflected upwardly by the hopper 110 and falls into the stack 30.

The first sticks dropped into the launcher 28 are typically dropped immediately into the well 10. This is done manually by the gauger by simply closing the upper valve 36 and opening the lower valve 34. When the sticks clear the launcher 28, the lower valve 34 is again closed by using the switch 84 and the upper valve 36 is opened followed by dropping one or more sticks into the launcher 28 using the loading ramp 116. Then, the middle valve 38 is closed by using the switch 84, the upper valve 36 is opened and one or more sticks are dropped into the stack 30 and come to rest on top of the valve 38. The intermediate valve 38 is then closed using the switch 86. The upper valve 36 is opened to again load chemical sticks into the stack 30. These sticks come to rest on top of the valve 38. The upper valve 36 is then closed using the switch 100.

At this stage, the launcher 28 is loaded and ready for normal operation under control of the timers 66, 68. The timers 66, 68 may be set by the actuators 78, 80 to open the valves 34, 38 at any desired time. Typically, a gauger will visit a well in the morning and drop sticks manually into the well 10. Thus, a typical plan is to drop sticks supported on the valve 34 in the early evening and drop sticks supported on the valve 38 in the early morning. Dropping sticks supported by the lower valve 34 and the intermediate valves 36 empties the launcher 28 and completes the operating cycle. It will be seen that a launcher 28 with one intermediate valve 38 can drop two sets of sticks, i.e. one set from above each of the lower valve and one intermediate valve 38. A launcher 28 with two intermediate valves 38, such as shown in FIG. 2, can drop three sets of sticks. Because wells are normally visited once each day by a gauger who can drop one set of sticks manually, an installation with one intermediate valve 38 can drop sticks at roughly eight hour intervals. An installation with two intermediate valves 38 can drop sticks at roughly six hour intervals.

It may happen that one or more of the switches 84, 86 fail for some reason so it may be desirable to have a manually operated back up. To this end, the timers 66, 68 may be equipped with a manual back up comprising an actuator 120 delivering direct current of valve opening polarity to the leads 74, 76 and an internal polarity reversing switch operated by a selector arm 122 for delivering direct current valve closing polarity to the leads 74, 76 upon depressing the actuator 120. In the event of failure of one of the switches 84, 86, the gauger may manually operate each timer by depressing the actuator 120 before and after tripping the selector arm 122.

Referring to FIG. 1, gas from the well 10 flows through the wing valve 24 and into the flow line 26. It may be desirable to shut the well 10 in for a short period after dropping chemical sticks, particularly soap sticks, to allow any flow into the well to agitate liquids at the bottom of the well and thereby promote foaming. To this end, a valve 124 having a direct current motor 126 may be placed in the flow line 26. A timer 128 is equipped to deliver direct current of both valve opening and valve closing polarity from the leads 62, 64 to an outlet lead 130 connected to the motor 126. The timer 128 is synchronized with the timers 66, 68 so the valve 124 closes when one of the valves 34, 38 opens, or shortly thereafter. The timer 128 keeps the valve 124 closed for a delay period of suitable duration, typically more than ten minutes and less than one hour, depending on the conditions of the well 10, and then delivers direct current of valve opening polarity to the motor 126. Thus, the well 10 is temporarily off production. This delay promotes foaming of soap in the bottom of the well and improves efficiency in removing water from the well 10. Synchronization of the valve 124 with the valves 34, 38 is easily done by simply setting the timer 128 to start the delay a few minutes after the time setting on the timers 66, 68 that opens the valves 34, 38. The valve 124 accordingly allows normal flow through the flow line 26 but intermittently stops flow to promote foaming in the well 10.

There are some circumstances when it is desirable to electrically operate the upper valve 36. In the embodiments previously described, the upper valve 36 is operated manually during the process of loading the launcher 28. Occasionally, gaugers will fail to reclose the upper valve 36 upon reloading the launcher 28. In this case, when the uppermost intermediate valve 38 opens to drop sticks into the well 10, the well 10 is then open to the atmosphere, causing the well 10 to deliver formation contents upwardly through the hopper 110 in an uncontrolled manner. This is awkward because of the discharge of formation liquids onto the ground near the well 10 and poses a fire hazard because of the discharge of gas and flammable liquids into the atmosphere. To avoid these problems, a timer or timer circuit 132 may be provided in parallel with the switch 100, in one mode of operation, to deliver valve closing direct current to the motor 42. In normal operations, the timer 132 is configured to deliver valve closing direct current to the motor 42 at any time before the timer 68 opens the uppermost intermediate valve 38. It may be preferred to configure the timer 132 to deliver valve closing direct current to the motor 42 shortly after the timer 66 opens the valve 34, e.g. less than thirty minutes later. This acts to close the upper valve 38 before well contents can be exhausted through the hopper 110. In the event the gauger has remembered to close the valve 38 manually, delivery of valve closing direct current to the actuator 42 does no harm.

Another use of the timer 132 involves scheduled or periodic flaring of gas from the well 10. Many gaugers over soap gas wells causing an accumulation of soap dissolved in formation liquids at the bottom of a well in what is often called soap soup. The only simple way to alleviate any problems with soap soup is to periodically flare gas from the well 10 at a maximum rate and thereby discharge much of the soap soup from bottom of the well 10. This may be accomplished by use of a flare trailer having a safe flare system with pipe connections for attachment to the Christmas tree 16 with flaring being initiated manually by the gauger. In the launcher 28, the upper valve 36 may be a three way valve equipped with an outlet 134 for connection to a flare trailer 136 by suitable pipe sections 138. After the last set of soap sticks are dropped by the launcher 28 and after a suitable delay, the timer 132, in a second mode of operation, may deliver direct current of valve opening polarity to the motor 42 thereby opening the valve 36 and delivering well contents to the flare trailer 136 which acts automatically to ignite the well contents. This may be done at any convenient time after the launcher 28 is emptied and before the expected arrival of the gauger. A preferred time to flare gas from the well 10 will typically turn out to be after the launcher 28 is empty following an early morning stick drop and after the beneficial effects of foaming well liquids has worn off to some degree. The timer 132 may be equipped to open the valve 38 and initiate flaring as well as closing the valve 38 after a suitable period to terminate flaring. An early morning flaring has the advantage of using the normal arrival of the gauger to stop flaring if the timer 132 is not used for this purpose. Thus, operation of the valve 38 in a periodic flaring operation is done in synchrony with operation of the launcher 28. The timer 132 may accordingly have two modes of operation and a selector 133 may be provided to select between the two modes.

In many situations, a check valve may be placed in the flow line 26 to prevent flow of gas toward the well 10 although some wells may be so equipped. In situations where there is no check valve and as a matter of prudence where the well 10 does include a check valve, it may be preferred for the controller 54 to deliver valve closing current to the valve 124 before the onset of a scheduled flaring operation. This may be accomplished in any suitable manner, as by setting the timer 128 to close the valve 124 at some time before the timer 132 is scheduled to open the valve 38 or by the timer 128 closing the valve 124 in response to a signal from the timer 132 or by the timer 132 sending valve closing current directly to the valve 124.

Referring to FIG. 4, an enlarged front view of one of the motors 42 illustrates a front panel 140 having a glassed in port hole 142 exposing an indicator 144 showing whether the valve 36 is open or closed. As shown in FIGS. 1 and 2, the valve motors 40, 42, 44 are all facing in the same direction so the indicator 144 is visible by a standing individual at one location. This allows the gauger to tell at a glance whether the valves 34, 36, 38 are open or closed without having to walk around the well 10 and looking up at the launcher 28.

Some shallow wells have small Christmas trees, which may not include a ladder, a platform or a special loading hopper because the gauger may back his truck next to the Christmas tree 16, stand in the truck bed and drop sticks through the upper valve 38 into the upper end of the conduit section 32. In the alternative, a conventional loading ramp and stick hopper may be used as discussed more fully in connection with FIG. 1.

It will be seen that the launcher 28 of FIGS. 1-4 is completely operated by electricity with no venting of power gas from a conventional piston/cylinder device. This eliminates release of another greenhouse gas, specifically methane, which is considerably more deleterious than carbon dioxide.

There are situations where wells are difficult to access daily or need only one soaping per day. Because the timers 66, 68, 128, 132 may have the capacity to operate over a seven day cycle, it may be practical to provide a launcher allowing one soaping per day if the spacing between the valves 34, 36, 38 is capable of accepting only one stick because there is a practical maximum height of the launcher 28. An embodiment of this type would allow daily soaping of the well 10 but the gauger would need to physically visit the site only once a week.

Referring to FIG. 5, there is illustrated a partial view of another stick launcher 146 including a vertical array or upright stack 148 including a series of electrically operated valves 150, only one of which is shown. The valves 150 are separated by nipples or pipe sections 152. The valves 150 may include a more-or-less conventional ball valve having a housing 154, a threaded shaft operator 156 and a handle 158 captivated to the operator 156 by a nut 160. An electrical actuator 162 includes an elongate housing 164 having a linearly movable rod 166 pivotally connected to a link 168 drivably receiving the shaft operator 156 and captivated to the operator 156 by the nut 160 and handle 158. The actuator 164 is commercially available from Duff-Norton Corp. of Charlotte, N.C. as Model LT225-1-250. This actuator has a stroke of almost 10" which is sufficient to move the valve ball (not shown) of the valve 150 between its open and closed positions. The opposite end of the actuator 164 is pivoted to a strut 168 fixed to one of the nipples 152. The actuator 164 includes an electric motor 168 driving a mechanism to advance and retract the rod 166. The motor 168 is controlled by timers (not shown) and double pole double throw switches (not shown) by a controller (not shown) in the same manner as the motors 40, 42, 44 in the embodiment of FIG. 1.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as set forth in the appended claims.

I claim:

1. A chemical stick launcher comprising
   a vertical array of valves separated by conduit sections configured to receive elongate sticks of chemical, the array being configured to attach to a hydrocarbon well delivering hydrocarbons through a flow line, there being a lower valve, an upper valve and at least one intermediate valve;
   the valves each configured to move between open and closed positions, and each including an electrical actuator configured to be operated with low voltage direct current in the range of 6-24 volts and being configured to move its respective valve between the open and closed positions;
   a solar panel configured to produce low voltage direct current in the range of 6-24 volts;
   at least one electrical battery operatively connected to the solar panel, the at least one battery having an operating voltage compatible with the solar panel;
   a controller operatively connected to the solar panel, the at least one battery and the electrical actuators of the lower valve and to the at least one intermediate valve, the controller comprising a timer for the lower valve and a timer for the at least one intermediate valve and configured to manipulate the actuators of the lower valve and the at least one intermediate valve to sequentially drop chemical sticks into the well at prescribed intervals; and a switch electrically connected to the at least one battery and configured to open and close the upper valve in response to manual commands;

each valve including a front panel having an indicator configured to designate whether the valve is open or closed, all of the valve front panels facing in the same direction so a standing individual can see each of the indicators without moving.

2. The chemical stick launcher of claim 1 further comprising insulation wrapped about the conduit sections, the insulation having an R value of at least two and the launcher is configured to operate with formulations subject to melting at expected summer temperatures above 105-115° F.

3. The chemical stick launcher of claim 1 wherein the timers comprise timers having the characteristic of delivering a first polarity of direct current and powering a rotatable motor in one direction more effectively than delivering a second polarity of direct current and powering the motor in an opposite direction, the timers being connected to the valve actuators delivering the first polarity in the valve opening direction.

4. The chemical stick launcher of claim 1 wherein the well includes a Christmas tree including at least two master valves and one wing valve, the wing valve being connected to a flow line leading to a surface installation, further comprising a valve configured to be placed in the flow line and having a direct current driven actuator and a timer connected to the actuator of the valve in the flow line and powered by the at least one battery, the timer being configured to close the valve in the flow line after the launcher is loaded with chemical sticks and after the lower valve is opened to drop chemical sticks into the well and, after a delay, reopening the valve in the flow line.

5. The chemical stick launcher of claim 4 wherein the timer connected to the actuator of the valve in the flow line is configured to close the valve in the flow line after the at least one intermediate valve is opened and, after a delay, reopening the valve in the flow line.

6. The chemical stick launcher of claim 1 wherein the upper valve includes an electrical actuator configured to be operated with low voltage direct current in the range of 6-24 volts and further comprising a manually operable switch connected to the at least one battery and configured to deliver direct current of opposite polarities to the electrical operator of the upper valve for manually opening and closing the upper valve.

7. The chemical stick launcher of claim 1 further comprising a device operatively connected to the upper valve and configured in a first mode of operation to deliver valve closing direct current to the upper valve before a next subjacent valve opens.

8. The chemical stick launcher of claim 7 further comprising a flare trailer connected downstream of the upper valve and configured to receive well contents from the well through the upper valve.

9. The chemical stick launcher of claim 8 wherein the device for the upper valve includes a second mode of operation by being also configured to open the upper valve at a predetermined time after the launcher is empty of chemical sticks and all of the subjacent valves are open, the device including a selector to change the mode of operation between the first and second modes.

10. A chemical stick launcher comprising a vertical array of valves separated by conduit sections configured to receive elongate sticks of chemical, the array being configured to attach to a hydrocarbon well delivering hydrocarbons through a flow line, there being a lower valve, an upper valve and at least one intermediate valve subjacent to the upper valve;

the valves each configured to move between open and closed positions, and each including an electrical actuator configured to be operated with low voltage direct current in the range of 6-24 volts and being configured to move its respective valve between the open and closed positions;

a solar panel configured to produce low voltage direct current in the range of 6-24 volts;

at least one electrical battery operatively connected to the solar panel, the at least one battery having an operating voltage compatible with the solar panel; and a controller operatively connected to the solar panel, the at least one battery and to the electrical actuators of the lower valve and to the at least one intermediate valve, the controller comprising a timer for the lower valve and a timer for the at least one intermediate valve and configured to manipulate the actuators of the lower valve and the at least one intermediate valve to sequentially drop chemical sticks into the well at prescribed intervals, a manual switch configured to open and close the upper valve, and a device for the upper valve configured in a first mode of operation to deliver valve closing direct current to the upper valve before a next subjacent valve opens.

11. The chemical stick launcher of claim 10 wherein the chemical stick launcher includes an operating cycle to deliver chemical sticks into the well, the operating cycle including opening the lower valve and then opening the next subjacent valve, the device being configured to deliver valve closing direct current to the upper valve after the lower valve opens.

12. The chemical stick launcher of claim 10 further comprising a flare trailer connected downstream of the upper valve and configured to receive well contents from the well through the upper valve.

13. The chemical stick launcher of claim 12 wherein the device for the upper valve includes a second mode of operation by being also configured to open the upper valve at a predetermined time after the launcher is empty of chemical sticks and all of the subjacent valves are open, the device including a selector to change the mode of operation between the first and second modes.

14. A chemical stick launcher comprising a vertical array of valves separated by conduit sections configured to receive elongate sticks of chemical, the array being configured to attach to a hydrocarbon well delivering hydrocarbons through a flow line, there being a lower valve, an upper valve and at least one intermediate valve;

the valves each configured to move between open and closed positions, and each including an electrical actuator configured to be operated with low voltage direct current in the range of 6-24 volts and being configured to move its respective valve between the open and closed positions;

a solar panel configured to produce low voltage direct current in the range of 6-24 volts;

at least one electrical battery operatively connected to the solar panel, the at least one battery having an operating voltage compatible with the solar panel;

a controller operatively connected to the solar panel, the at least one battery and to the electrical actuators of the lower valve and to the at least one intermediate valve, the controller comprising a timer for the lower valve and a timer for the at least one intermediate valve and configured to manipulate the actuators of the lower valve and the at least one intermediate valve to sequentially drop chemical sticks into the well at prescribed intervals, and a switch electrically connected to the at least one battery and configured to open and close the upper valve.

15. The chemical stick launcher of claim 14 further comprising insulation wrapped about the conduit sections, the insulation having an R value of at least two and the launcher is thereby configured to operate with formulations subject to melting at expected summer temperatures above 105-115° F.

16. The chemical stick launcher of claim 15 wherein the timers comprise timers having the characteristic of delivering a first polarity of direct current and powering a rotatable motor in one direction more effectively than delivering a second polarity of direct current and powering the motor in an opposite direction, the timers being connected to the valve actuators delivering the first polarity in the valve opening direction.

17. The chemical stick launcher of claim 14 wherein the well includes a Christmas tree including at least two master valves and one wing valve, the wing valve being connected to a flow line leading to a surface installation, the launcher further comprising a valve in the flow line having a direct current driven actuator and a timer connected to the actuator of the valve in the flow line and powered by the solar panel array, the timer being configured to close the valve in the flow line after the launcher is loaded with chemical sticks and after the lower valve is opened to drop chemical sticks into the well and, after a delay, reopening the valve in the flow line.

18. The chemical stick launcher of claim 17 wherein the timer connected to the actuator of the valve in the flow line is configured to close the valve in the flow line after the at least one intermediate valve is opened and, after a delay, reopening the valve in the flow line.

19. The chemical stick launcher of claim 14 wherein each valve includes a front panel having an indicator configured to designate whether the valve is open or closed, all of the valve front panels facing in the same direction so a standing individual can see each of the indicators without moving.

20. The chemical stick launcher of claim 14 wherein the switch is configured to be manually operated and further comprising a timer operatively connected between the upper valve and the at least one battery and configured to open and close the upper valve in response to the timer.

* * * * *